(12) United States Patent
Alieiev et al.

(10) Patent No.: US 10,624,029 B2
(45) Date of Patent: Apr. 14, 2020

(54) METHOD FOR OPERATING A MOBILE RADIO STATION, AND RELAY RADIO STATION AND MOBILE RADIO STATION FOR USE IN THE METHOD

(71) Applicant: VOLKSWAGEN AKTIENGESELLSCHAFT, Wolfsburg (DE)

(72) Inventors: Roman Alieiev, Stendal (DE); Andreas Kwoczek, Lehre (DE); Thorsten Hehn, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/084,248

(22) PCT Filed: Jan. 27, 2017

(86) PCT No.: PCT/EP2017/051790
§ 371 (c)(1),
(2) Date: Sep. 12, 2018

(87) PCT Pub. No.: WO2017/157558
PCT Pub. Date: Sep. 21, 2017

(65) Prior Publication Data
US 2019/0069236 A1    Feb. 28, 2019

(30) Foreign Application Priority Data

Mar. 16, 2016   (DE) .................. 10 2016 204 387
Jul. 1, 2016    (DE) .................. 10 2016 212 002

(51) Int. Cl.
*H04W 52/02*   (2009.01)
*H04W 76/28*   (2018.01)
*H04W 88/04*   (2009.01)

(52) U.S. Cl.
CPC ... *H04W 52/0216* (2013.01); *H04W 52/0206* (2013.01); *H04W 76/28* (2018.02);
(Continued)

(58) Field of Classification Search
CPC .................. H04W 52/0216; H04W 56/00
See application file for complete search history.

(56) References Cited

U.S. PATENT DOCUMENTS

2007/0086370 A1*  4/2007  Jang ............... H04L 1/0025
                                                  370/318
2008/0045145 A1   2/2008  Nakatsugawa
(Continued)

FOREIGN PATENT DOCUMENTS

DE         10025725 A1    12/2001
DE     102010007261 A1     8/2011
(Continued)

OTHER PUBLICATIONS

Vinella et al.; Discontinuous Reception and Transmission (DRX/DTX) Strategies in Long Term Evolution (LTE) for Voice-Over-IP (VOIP) Traffic under Both Full-Dynamic and Semi-Persistent Packet Scheduling Policies; Aalborg University, Department of Electronic Systems, Radio Access Technology Section; Thesis Report; Nov. 20, 2009.

(Continued)

*Primary Examiner* — Melanie Jagannathan
(74) *Attorney, Agent, or Firm* — Barnes & Thornburg LLP (57) ABSTRACT

An LTE mobile radio system to operate a mobile radio station at the edge of a coverage area via relay stations. Even in parked transportation vehicles, communication takes place via LTE for data services or for telephony. The disclosed vehicle-based relay radio station is useful in areas with little or no coverage because the disclosed system (Continued)

eliminates continual operation by providing a sleep/wake cycle for the relay radio station and for the subscriber terminal stations connected thereto increasing efficiency of the communication with regard to the loads on the transportation vehicle battery.

12 Claims, 4 Drawing Sheets

(52) U.S. Cl.
CPC .......... *H04W 88/04* (2013.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/21* (2018.01); *Y02D 70/23* (2018.01); *Y02D 70/24* (2018.01); *Y02D 70/25* (2018.01)

(56) References Cited

U.S. PATENT DOCUMENTS

| | | | |
|---|---|---|---|
| 2009/0036050 A1* | 2/2009 | Min | H04W 52/46 455/7 |
| 2011/0181106 A1 | 7/2011 | Kim | |
| 2011/0305294 A1* | 12/2011 | Moriya | H04W 52/0216 375/295 |
| 2012/0052796 A1 | 3/2012 | Takano | |
| 2013/0064173 A1 | 3/2013 | Sivavakeesar et al. | |
| 2013/0093621 A1* | 4/2013 | Tanaka | G01S 19/30 342/357.68 |
| 2013/0201079 A1* | 8/2013 | Chao | G09G 5/003 345/1.2 |
| 2016/0007291 A1* | 1/2016 | Mizutani | H04W 52/0241 370/311 |
| 2016/0192433 A1* | 6/2016 | Deenoo | H04W 72/046 370/329 |
| 2016/0286502 A1* | 9/2016 | Sugitani | H04W 52/16 |
| 2019/0116556 A1* | 4/2019 | Golsch | H04B 17/318 |

FOREIGN PATENT DOCUMENTS

| | | |
|---|---|---|
| DE | 102015101044 A1 | 8/2015 |
| DE | 102015107697 A1 | 11/2015 |
| EP | 2683184 A1 | 1/2014 |
| GB | 2484347 A | 4/2012 |
| JP | 2009206749 A | 9/2009 |
| JP | 2013502802 A | 1/2013 |
| JP | 2014183550 A | 9/2014 |
| JP | 2015519816 A | 7/2015 |
| WO | 2007145035 A1 | 12/2007 |

OTHER PUBLICATIONS

Search Report for German Patent Application No. 10 2016 212 002.6; dated Jan. 23, 2017.
Search Report for International Patent Application No. PCT/EP2017/051790; dated May 15, 2017.

* cited by examiner

METHOD FOR OPERATING A MOBILE RADIO STATION, AND RELAY RADIO STATION AND MOBILE RADIO STATION FOR USE IN THE METHOD

PRIORITY CLAIM

This patent application is a U.S. National Phase of International Patent Application No. PCT/EP2017/051790, filed 27 Jan. 2017, which claims priority to German Patent Application Nos. 10 2016 204 387.0, filed 16 Mar. 2016, and 10 2016 212 002.6, filed 1 Jul. 2016, the disclosures of which are incorporated herein by reference in their entireties.

SUMMARY

Illustrative embodiments relate to a method for operating a mobile radio station, wherein the communication between base station and the mobile radio station is routed via a relay radio station. Illustrative embodiments additionally relate to a relay radio station and a mobile radio station for use in the method.

BRIEF DESCRIPTION OF THE DRAWINGS

An exemplary embodiment is depicted in the drawings and is explained in more detail below on the basis of the figures, in which.

DETAILED DESCRIPTION

The basis for the disclosure is, first of all, the scenario of transportation vehicles that are equipped radio communication modules and communicate with one another directly on public roads, be it for cooperative or autonomous driving. Techniques for vehicle-to-vehicle direct communication have already been developed and are being developed further. An example that is mentioned is transportation vehicle direct communication via WLAN, in this case, in particular, the option based on WLAN standard IEEE 802.11p. This technique involves WLAN networks being set up on an ad hoc basis for communication between the transportation vehicles (communication in the realm of the "Ad Hoc Domain").

Transportation vehicle communication is also possible in the realm of mobile radio networks, however. This technique requires the base station to convey the messages from transportation vehicle to transportation vehicle, however. This is the realm where communication takes place in what is known as the "Infrastructure Domain". For the coming mobile radio generation, transportation vehicle direct communication is also made possible. In the case of LTE, this option is called LTE-V; in the case of the 5G initiative, this option is called device-to-device (D2D).

Typical communication scenarios are safety scenarios, traffic efficiency scenarios and infotainment. For the realm of safety, the following scenarios are cited: "Cooperative Forward Collision Warning", "Pre-Crash Sensing/Warning", "Hazardous Location Warning". In these realms, the transportation vehicles interchange information such as position, direction and speed with one another, and also parameters such as size and weight. Further information transmitted relates to intention information, such as "transportation vehicle intends to overtake", "transportation vehicle turning left/right", etc., which is of interest for the cooperative driving. This often involves sensor data being transmitted. If there is a hazardous situation and the driver does not react, the transportation vehicle could automatically slow down, so that an accident is prevented or at least the consequences of the unavoidable accident are kept to a minimum. In the realm of "Platooning", which is the realm of driving in a transportation vehicle convoy, there are plans to report, e.g., information about the planned braking behavior from front to back to avoid shunt accidents.

In the realm of traffic efficiency, the following are cited: "Enhanced Route Guidance and Navigation", "Green-Light Optimal Speed Advisory" and "V2V Merging Assistance".

In the realm of infotainment, Internet access is in the foreground.

At present, the following mobile radio technologies are applicable for a vehicle-to-vehicle communication: 3GPP-based UMTS, HSPA, LTE, and the future 5G standards. For a transportation vehicle direct communication, LTE-V and 5G D2D are mentioned.

In recent years, LTE technology has become one of the most important mobile radio communication systems. It governs various scenarios and provides a mobile data connection for static and for dynamic environments. However, scenarios continue to exist in which LTE cannot cope. A prominent example from the transportation vehicle realm is the multistory carpark scenario, where excessive attenuations prevent operation. The standardization committee is attempting to counter high-attenuation scenarios with the LTE-M standard. These are designed more for cellars than for underground carparks, however.

There is thus the situation that the supply of data to transportation vehicles in areas having poor network coverage, in particular, in underground carparks, is not definite. Although it would be possible to install further static base stations in such areas, this requires a high level of installation and maintenance complexity and also a high level of financial outlay for the mobile radio operators. Even if the parked transportation vehicle were nevertheless able to set up a connection to the base station by increasing transmission power, that is to say without additionally installed fixed stations in the underground carpark, there is the risk that the transportation vehicle battery will discharge too greatly. The transportation vehicle can then either no longer be started or the range of the transportation vehicle decreases in the case of electromobility, which is likewise undesirable.

Initial approaches to improving network coverage and to increasing bandwidth are based on relay radio engineering and are known in the 4th mobile radio generation under the headword 4G LTE Advanced Relay. In this case, however, there is provision for a static relay radio station to be installed. Although the costs for the relay radio station are much lower than for a base station, an evolved Node Base (eNodeB) in the vernacular of LTE, there is still installation and maintenance complexity.

To operate mobile radio stations efficiently, there also continues to be the discontinuous reception (DRX) approach. In this case, mobile radio stations, user equipment (UE) in the vernacular of LTE, are deliberately put into sleep states in which less energy is consumed. The devices are regularly woken again to be able to receive the data intended for them and to provide them with the opportunity to send their data.

A description of the DRX mode of operation can be found in a thesis report by the Department of Electronic Systems, Radio Access Technology Section, at Aalborg University dated Nov. 20, 2009, entitled "Discontinuous Reception And Transmission (Drx/Dtx) Strategies in Long Term Evolution (Lte) for Voice-Over-IP (VOIP) Traffic under both Full-Dynamic and Semi-Persistent Packet Scheduling Policies", by Dario Vinella and Michele Polignano.

With the "Discovery Signal", the mobile radio industry has developed a solution to wake devices in the sleep state. This solution is unusable for the underground carpark scenario, however. The reason is that the discovery signal solution is always based on the assumption that the small cells around the relay and hence the UEs registered therein are in the coverage area of a macrostation. In the underground carpark scenario, however, there is no assurance of this very fact and it must be assumed that the UEs are not in the coverage area of the macrocell.

A solution for the multistory carpark scenario is based on the relay radio approach. Relay radio technology is known.

Sleep states for the UE are already known, but the mobile radio industry always assumes that the base station is permanently active.

Efficiency is a central topic in mobile radio. Standardization committees such as the 3GPP put a great deal of effort into power saving mechanisms. These are for the most part directed at the user equipment and the associated battery runtime of the terminal, however. The basic idea behind these mechanisms is that mobile radio cell and UE arrange a sleep cycle and a wake time for the UE. The mobile radio cell remains active and will send information relevant to this subscriber terminal station UE (e.g., incoming call) only when the wake time of the UE has been reached.

The subscriber terminal station UE will continue to read synchronization information from the base station in this time, but no paging information (that is to say data relating to the setup of a telephone call). As a result, the UE can save significant power, but continues to remain mobile. If it moves out of the cell, for example, it remembers this when reading the synchronization information and can wake accordingly to initiate handover processes and the like.

The new approach sets out from the DRX mode and transfers this concept to relay radio engineering. The aim is for the relay radio station and the subscriber terminal stations UE connected via the latter to be operated as efficiently as possible.

This is achieved by a method for operating a mobile radio station, a relay radio station, and a mobile radio station.

Based on the novel concept, besides "Discontinuous Reception" (DRX) a "Discontinuous Synchronization" (DS) mode of operation and a "Discontinuous Access" (DA) mode of operation are also introduced. Thus, a discontinuous transmission mode is also introduced for a relay radio station. This is consistent with an extension to the existing mobile radio standard LTE, in particular, for the 5th generation 5G.

The concept presented here becomes important if the transportation vehicle and its mobile communication equipment are intended to be used as a relay/mobile base station (Small Cell). This is because the relay radio station is then installed in the transportation vehicle and, if the transportation vehicle is parked, the transportation vehicle battery would be under load during operation of the relay.

As a solution for the underground carpark scenario, a communication protocol for the control channel is therefore proposed that can be summarized as follows:

Send the configuration information "Discontinuous Reception and Access" (DRxA): the relay notifies all registered UEs of for how long they are not supplied with paging information in the downlink and have no access to the uplink (Random Access Channel). This mode of operation is consistent with a combined DRX and DA mode.

Acknowledge receipt of the configuration information DRxA: the UEs notify the relay that they have received and will comply with the configuration. Optionally, a UE can also send a nonacknowledgement (NACK) and request another clock cycle.

Send the configuration information "Discontinuous Synchronization" (DS): the relay notifies the UEs of the clock cycle in which synchronization information is sent by the relay.

Acknowledge receipt of the configuration information DS: the UEs notify the relay that they have received and will comply with the configuration. Optionally, a UE can also send a nonacknowledgement (NACK) and request another clock cycle.

Based on this protocol, base station and UE now have to observe the following wake order:

For Discontinuous Sync, both relay and UE wake together.

For Discontinuous Reception and Access, relay and UE wake together. The relay transmits "Common Reference Symbols" and, if present, data for the registered UEs. The relay also listens out for communications via the "Random Access Channel" to hear of incoming connections from UEs.

The UEs wake at this point, but possibly need only use part of their functionality:

All UEs have to listen out for incoming connections.

Only UEs that need to send data use the Random Access Channel for their uplink transmissions.

For setting up the energy saving mode on the relay radio station, it is beneficial that the latter is equipped with communication methods or mechanisms that send a first control message to the mobile radio station (UE) before the energy saving mode is initiated, which control message is used to notify the mobile radio station (UE) of the nature of the sleep/wake cycle of the relay radio station (RN) during the energy saving mode with regard to the downlink transmission direction from the point of view of the mobile radio station. As such, the sleep/wake cycles of relay radio station and subscriber terminal station can be synchronized easily.

This purpose is also served by the further measures of sending a second control message to the mobile radio station notifying the mobile radio station of the nature of the sleep/wake cycle of the relay radio station during the energy saving mode with regard to the uplink transmission direction from the point of view of the mobile radio station, and sending a third control message to the mobile radio station notifying the mobile radio station of the nature of the sleep/wake cycle of the relay radio station during the energy saving mode with regard to the transmission of synchronization information to the mobile radio station.

The first and second control messages may be combined to form a combined control message if the simultaneous transmission of data in the uplink and downlink directions is possible in one mode of operation (full-duplex mode).

For a disclosed mobile radio station, the applicable measures are beneficial. It is very beneficial that the mobile radio station has communication methods or mechanisms that, after receipt of a first, second or third control message used by a relay radio station to notify the mobile radio station of the nature of the sleep/wake cycle of the relay radio station during the energy saving mode with regard to the downlink transmission direction, the uplink transmission direction from the point of view of the mobile radio station or with regard to the transmission of synchronization information, return an acknowledgement message to the relay radio station before the energy saving mode is initiated, in which receipt and acceptance of the sleep/wake cycle communicated in the first, second or third control message is acknowledged. This is also used for synchronizing the sleep/wake states of relay radio station and mobile radio station.

To meet the demands of ongoing processes in the mobile radio station, it is beneficial if the communication methods or mechanisms return a negative acknowledgement message to the relay radio station instead of the acknowledgement message, which negative acknowledgement message is used to notify the relay radio station of the nonacceptance of the sleep/wake cycle communicated in the first, second or third control message.

In this regard, for efficient operation, it is then also beneficial if the communication methods or mechanisms use the negative acknowledgement message to send a counterproposal for arranging a modified sleep/wake cycle to the relay radio station. As such, it is then possible for a different, better suited sleep/wake rhythm to be arranged.

The present description illustrates the principles of the disclosure. It is therefore self-evident that persons skilled in the art will be capable of designing various arrangements that, although not described explicitly here, embody principles of the disclosure and are likewise intended to have their scope protected.

Figure 1:
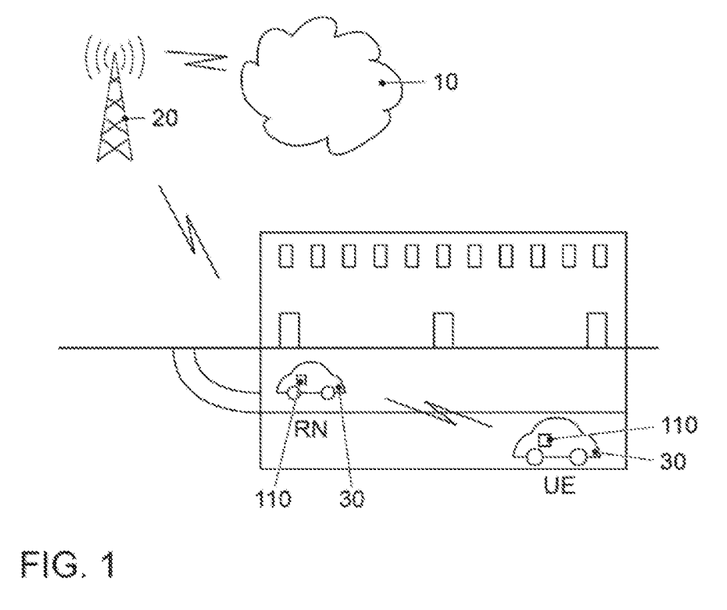
FIG. 1 shows the problem in mobile radio in the underground carpark scenario.

FIG. 1 shows the problem of the underground carpark scenario for the mobile communication. Two transportation vehicles are shown that are provided with the reference numeral 30. The transportation vehicles are each equipped with an onboard unit 110 that serves as a transmission and reception unit for the mobile communication. All messages from the transportation vehicles (uplink) and to the transportation vehicles (downlink) are either routed via a base station 20 serving a mobile radio cell or, in the case of the transportation vehicle direct communication (sidelink), interchanged directly between the transportation vehicles 30. If the transportation vehicles are inside this mobile radio cell, they are registered with the base station 20. If they leave the mobile radio cell, they are transferred to the adjacent cell (handover) and accordingly deregistered at the base station 20. The base station 20 also provides access to the Internet 10, so that the transportation vehicles 30 and all other mobile radio subscribers in the mobile radio cell are supplied with Internet data.

These techniques are standardized and reference is made in this regard to the applicable specifications of mobile radio standards. As a modern example of a mobile radio standard, reference is made to the 3GPP initiative and the LTE (Long Term Evolution) standard. Many of the associated ETSI specifications are currently available in version 13. The following is cited as an example: ETSI TS 136 213 V13.0.0 (2016-05); Evolved Universal Terrestrial Radio Access (E-UTRA); Physical layer procedures (3GPP TS 36.213 version 13.0.0 Release 13).

The problem with the underground carpark scenario considered in the case of the disclosure is now that the network coverage in an underground carpark is often nonexistent. Radio waves are known to penetrate concrete walls only with difficulty, which means that a mobile radio subscriber in the rear part or lower part of an underground carpark cannot receive a mobile radio signal. FIG. 1 now shows a transportation vehicle 30 parked in the lower part of the underground carpark. The onboard unit 110 of this transportation vehicle is configured as user equipment UE. This transportation vehicle has no connection to the base station 20 on account of the poor network coverage in the rear/lower part of the underground carpark.

In the front area of the underground carpark, close to the exit or entrance or else close to light or supply shafts, the network coverage is often better. A transportation vehicle 30 is likewise parked there. The onboard unit 110 of this transportation vehicle is configured as a relay radio station (relay node) RN. Thus, this transportation vehicle 30 is used to ensure mobile radio coverage in the rear/lower part of the underground carpark. Firstly, the relay radio station maintains the radio link to the base station 20. Secondly, the other transportation vehicles in the rear/lower part of the underground carpark are registered with the relay radio station RN. For these transportation vehicles, the relay radio station forwards their messages to the base station 20. Conversely, the messages sent from the base station 20 to the subscribers UE are received by the relay radio station RN in the downlink transmission direction and forwarded to the subscribers UE. As such, it is also possible to supply those transportation vehicles that are unable to set up a direct radio link to the base station 20 with mobile communication.

The selection of which transportation vehicle is configured as a relay radio station RN is made according to particular criteria. This transportation vehicle should still have a connection to the base station 20 and simply be in the underground carpark at the same time. For this, e.g., the transportation vehicle navigation system can provide the information that the transportation vehicle is in the underground carpark. Should the transportation vehicle leave the underground carpark, another transportation vehicle is configured as relay radio station. It is also possible for the function of operating as a relay radio station to have a time limit to keep down the loading on the battery of this transportation vehicle.

The use of a relay radio station RN is specified in the existing LTE standard. For the disclosure, express reference is made to the specification ETSI TS 136 216 V13.0.0 (January 2016); Universal Mobile Telecommunications System (UMTS); LTE; Evolved Universal Terrestrial Radio Access (E-UTRA); Physical layer for relaying operation (3GPP TS 36.216 version 13.0.0 Release 13).

The relay radio station is operated not continuously but rather sporadically, i.e., a sleep/wake cycle is defined for the relay RN. When the relay is in the waking state, the data from the registered subscribers are transmitted to the base station in the uplink direction. The messages from the base station are likewise transmitted to the subscribers in the downlink direction. Many functions of an LTE base station eNodeB are also performed by the relay radio station RN. The high power consumption methods or mechanisms that this is a problem if the relay station is accommodated in the parked transportation vehicle, as considered here. The sporadic operation with a sleep/wake cycle can solve this problem.

Figure 2:
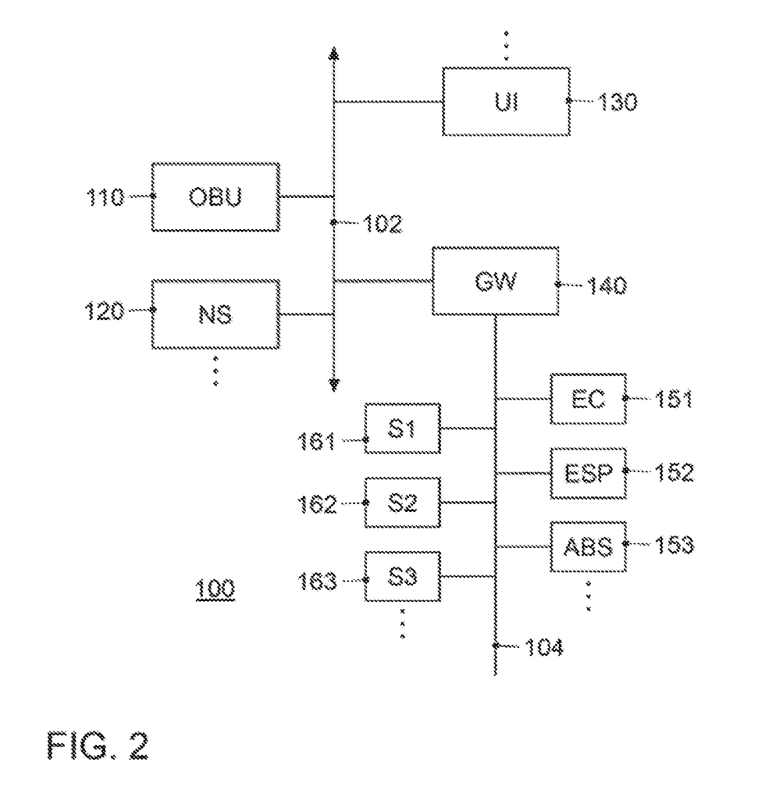
FIG. 2 shows a block diagram of the transportation vehicle electronics of a transportation vehicle.

FIG. 2 shows the typical design of transportation vehicle electronics in a modern transportation vehicle. The reference numeral 151 denotes an engine controller. The reference numeral 152 corresponds to an ESP controller and the reference numeral 153 denotes an ABS controller. Further controllers such as the gearbox controller, airbag controller, etc., may be present in the transportation vehicle. Such controllers are typically networked using the CAN (Controller Area Network) bus system 104, which is standardized as an ISO standard, ISO 11898. Since a wide variety of sensors are installed in the transportation vehicle and these are no longer connected just to individual controllers, such sensor data are likewise transmitted to the individual controllers via the bus system 104. Examples of sensors in the transportation vehicle are wheel speed sensors, steering angle sensors, acceleration sensors, rotation rate sensors, tire pressure sensors, distance sensors, etc. The various sensors with which the transportation vehicle is equipped are denoted by the reference numeral 161, 162, 163 in FIG. 5.

The modern transportation vehicle can have further components still, however, such as video cameras, e.g., as a reversing camera or as a driver monitoring camera, and a radar device for providing radar cruise control or for providing a distance warning or collision warming device.

The transportation vehicle then also contains further electronic apparatuses still. These are arranged more in the area of the passenger compartment and are often also operated by the driver. Examples are a user interface apparatus with which the driver can and select driving modes, but can also operate conventional components. These include gear selection and also turn signal indicator control, windshield wiper control, light control, etc. This user interface arrangement is provided with the reference numeral 130. The user interface arrangement 130 is often also equipped with a rotary/push switch by which the driver can select the various menus displayed on a display in the cockpit. Secondly, a touch-sensitive display is also covered by this category. Even the voice input for operating assistance falls into this realm.

A navigation system 120, which is likewise installed in the area of the cockpit, is often distinguished therefrom. The route displayed on a map can naturally likewise be depicted on the display in the cockpit. Further components, such as a hands-free device, may be present, but are not depicted in more detail. The reference numeral 110 also denotes an onboard unit. This onboard unit 110 is consistent with a communication module by which the transportation vehicle can receive and send mobile data. Typically, this is a mobile radio communication module, e.g., based on the LTE standard.

The devices in the passenger compartment are likewise networked to one another via a bus system, which is denoted by the reference numeral 102. This may be, e.g., the high-speed CAN bus system based on the ISO 11898-2 standard, but in this case in the option for data transmission at a higher data rate between infotainment devices. For the intended purpose of transmitting transportation vehicle-relevant sensor data to another transportation vehicle or to a central computer via the communication interface 110, the gateway 140 is provided. This is connected to the two different bus systems 102 and 104. The gateway is designed to convert the data it receives via the CAN bus 104 such that they are converted to the transmission format of the high-speed CAN bus 102, so that they can be distributed in the packets specified thereon. For the purposes of forwarding these data to the outside, that is to say to another transportation vehicle or to a central computer, the onboard unit 110 having the communication interface 110 is equipped to receive these data packets and in turn to convert them into the transmission format of the accordingly used mobile radio standard.

Figure 3:
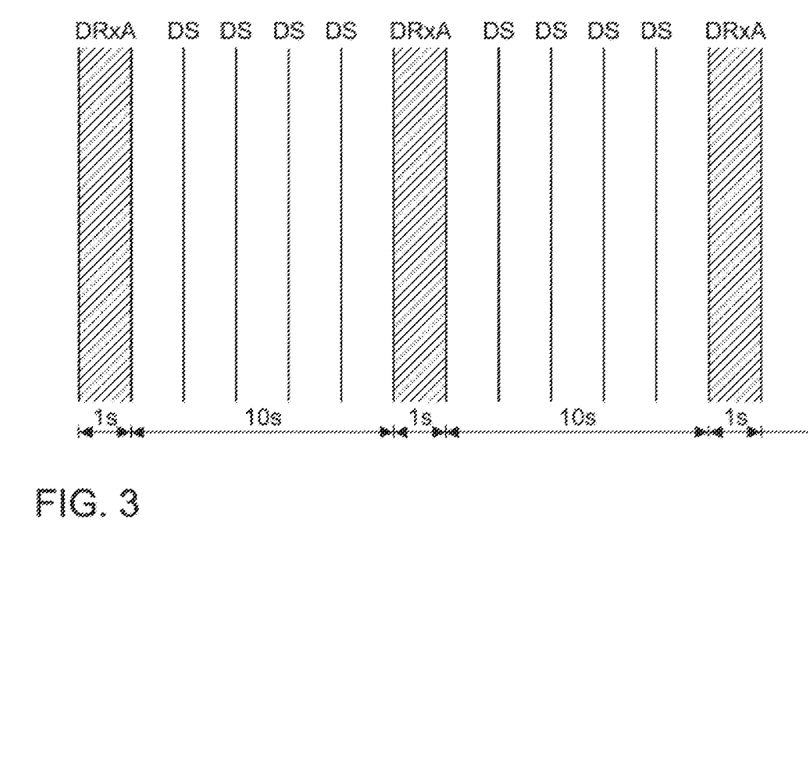
FIG. 3 shows the sleep/wake cycle for the DRxA and DS modes of operation.

FIG. 3 shows an example of a sleep/wake cycle for a relay radio station RN. At the start of FIG. 3, the relay is operated in the DRxA mode of operation. This is a first waking phase that lasts for one second in the example. There follows a sleep phase of 10 s duration, interrupted by short waking phases in which the relay is operated in the DS mode of operation. There are 4 successive waking phases shown in the DS mode of operation, which are thus each successive at an interval of 2 s. The duration of operation in the DS mode is just a few ms, with 10 ms being cited as an example. FIG. 3 also shows a second cycle and the start of the third cycle.

In the DRxA mode of operation, the data traffic occurs both in the uplink transmission direction and in the downlink transmission direction. For the downlink transmission direction, the physical channel Physical Downlink Shared CHannel PDSCH from LTE is used. For the data transmissions in the uplink transmission direction, the physical channel Physical Uplink Shared CHannel PUSCH from LTE is used.

The relay radio station and the subscriber terminal station are configured using control messages, however. These control messages are transmitted via appropriate control channels. For the downlink transmission direction, the physical control channel Relay Physical Downlink Control CHannel R-PDCCH from LTE is used. For the uplink transmission direction, the physical control channel Physical Uplink Control CHannel PUCCH from LTE is used.

Figure 4:
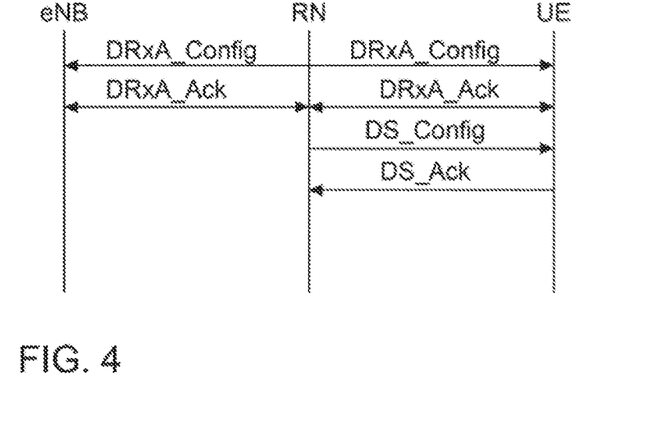
FIG. 4 shows the communication protocol for the control channel that the relay radio station uses to initiate the change to the DRxA and DS modes of operation.

Which control messages for configuring relay radio station RN and subscriber terminal station UE are interchanged via the control channels is shown by FIG. 4. The figure shows that the relay RN first of all sends a DRxA_Config control message to the subscriber terminal station UE via the control channel R-PDCCH. This informs the subscriber terminal station UE that the relay radio station RN intends to change to the sleep state. The control message also indicates how long the announced sleep state will last, that is to say 10 s for the example shown in FIG. 3. The terminal station acknowledges receipt of the control message DRxA_Config by itself using the uplink control channel PUCCH to send the control message DRxA_Ack back to the relay radio station. The two devices relay radio station RN and subscriber terminal station UE then change to the sleep state. At the same time, a timer is started, which is programmed to the value communicated in the control message DRxA_Config. The timer then counts down and wakes the station again after the timer has expired. In at least one exemplary embodiment, this timer can be realized by software executed by a processor in the station. Alternatively, the timer can be realized by hardware. In the example shown in FIG. 3, the sleep phase for the DRxA mode of operation is 10 s. After 10 s has elapsed, relay radio station and subscriber terminal station UE are woken again. In the example of FIG. 3, they then remain active for the period of 1 s to perform data transmissions. In this phase, the relay radio station RN will also transmit the "Common Reference Symbols" required for channel estimation. These are transmitted to particular positions of resource blocks in the transmission frame via the LTE channel PDSCH. Subsequently, a control message DRxA_Config would be sent from the relay radio station RN to the subscriber terminal station UE again to initiate the next sleep phase. This solution is very flexible because every sleep phase is initiated afresh, which means that the duration of the sleep phase is freely programmable in each case.

Similarly, FIG. 4 shows that the relay radio station RN sends a control message DS_Config to the subscriber terminal station UE. In the example, this control message is still sent in the waking state to the subscriber terminal station UE, likewise via the control channel R-PDCCH. The control message DS_Config also indicates how long the announced sleep state will last in regard to the DS mode of operation, that is to say 2 s for the example shown in FIG. 4. The relay radio station RN then still awaits receipt of the control message DS_Ack, which the subscriber terminal station UE returns. When this has occurred, a timer is again started that is programmed for the value communicated in the control message DS_Config. The timer then counts down and wakes the station again after the timer has expired. In the waking state of the DS mode of operation, the relay sends synchronization information. The LTE standard stipulates which synchronization information the base station is meant to transmit. This synchronization information is likewise sent by the relay radio station RN, specifically using the broadcast transmission mode provided for in the standard. This can be accomplished using the downlink channel R-PDCCH.

The communication between eNB and the relay radio station RN can be effected using a proprietary tunnel solution or as is customary between base station eNB and subscriber terminal station UE. The relay radio station RN will receive messages sent to the subscriber terminal stations UE registered with it and will then forward the messages to the subscriber terminal stations UE. Alternatively, the relay radio station RN can also send a control message DRxA_Config to the base station eNodeB, so that the base station is then likewise synchronized to the sleep/wake cycle of the relay station RN.

Figure 5:
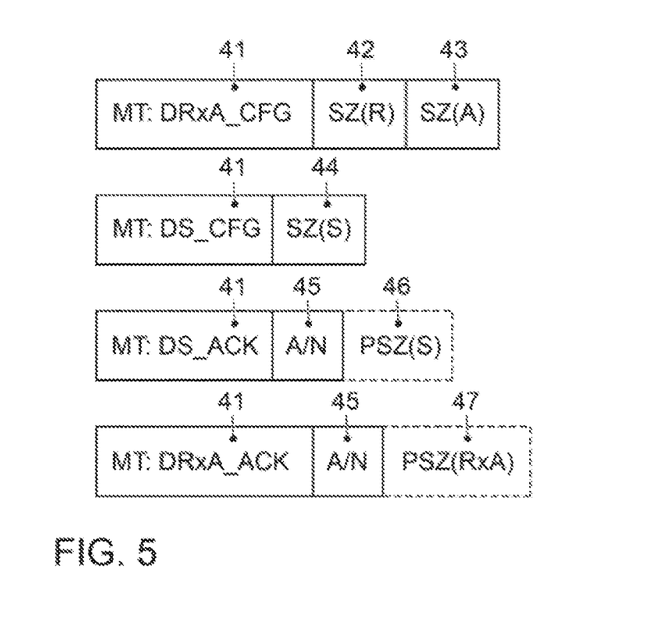
FIG. 5 shows the formats of the control messages used to initiate the DRxA and DS modes of operation and also the formats of the associated control messages used for acknowledgement of the introduction of the mode of operation by the terminals relating thereto.

FIG. 5 also shows the format of the control messages DRxA_Config, DRxA_ACK, DS_Config and DS_ACK. Each message begins with a header 41 in which the message type is denoted. In the case of the control message DRxA_Config, a data field 42 follows in which the sleep time SZ(R) before the next waking with the possibility of receipt of data by the downlink is entered. There then follows another data field 43 in which the sleep time SZ(A) before the next waking with the possibility of sending the data in the uplink transmission direction is entered. The two values are of equal magnitude, since data can be sent and received at the same time in full-duplex mode in the case of LTE and the two states DRX and DA have been combined to form the DRxA mode of operation. In the example of FIG. 3, the value is 10 s. The format of the control message DS_Config for configuring the DS mode of operation is shown in second place in FIG. 5. The header 41 shows the entry for this message type. In the data field 44, the sleep time SZ(S) is entered. In the example of FIG. 3, the value is 2 s. Below that, FIG. 5 also shows the formats of the control messages DRxA_ACK and DS_ACK. The header 41 again contains the entry for the message type. The next data field 45 is used to enter whether or not the configuration is performed as required. A one-bit field holding an ACK or NACK bit is adequate therefor in practice. If a negative acknowledgement NACK has been entered, then there also follows a further data field 46 or 47 into which a proposed different sleep time PSZ(RxA) or PSZ(S) is entered. Hence, it is thus possible for the terminal to request, e.g., a shorter sleep time, for example, to make better provision for a data service running in the device. A cited example is a running software update or a map update for the navigation system.

It should be understood that the proposed method and the associated apparatuses can be implemented in various forms of hardware, software, firmware, special processors or a combination of these. Special processors can comprise application specific integrated circuits (ASICs), reduced instruction set computer (RISC) and/or field programmable gate arrays (FPGAs). Optionally, the proposed method and the apparatus are implemented as a combination of hardware and software. The software may be installed as an application program on a program memory apparatus. Typically, it is a machine on the basis of a computer platform that has hardware, such as one or more central processing units (CPU), a random access memory (RAM) and one or more input/output (I/O) interface(s), for example. An operating system is moreover typically installed on the computer platform. The various processes and functions described here may be part of the application program, or a part executed by the operating system.

The disclosure is not restricted to the exemplary embodiments described here. There is latitude for various adaptations and modifications that a person skilled in the art would, on the basis of his knowledge in the art, consider as also being part of the disclosure.

LIST OF REFERENCE SIGNS

10 Internet
20 Base station
30 Transportation vehicle
41 Header with message type
42 1st data field for sleep time
43 2nd data field for sleep time
44 3rd data field for sleep time
45 4th data field for acknowledgement
46 5th data field for proposed sleep time
47 6th data field for proposed sleep time
100 Block diagram of transportation vehicle electronics
102 High-speed CAN bus
104 CAN bus
110 Onboard unit
120 Navigation system
130 User interface arrangement
140 Gateway
151 Engine controller
152 ESP controller
153 ABS controller
161 Sensor 1
162 Sensor 2
163 Sensor 3

The invention claimed is:

1. A method for operating a mobile radio station, wherein communication between a base station and mobile radio station is routed via a relay radio station, the method comprising:
   operating the mobile radio station in an energy saving mode in which the mobile radio station is intermittently put into a sleep state;
   operating the relay radio station in an energy saving mode in which the relay radio station is intermittently put into a sleep state;
   synchronizing the sleep/wake states of mobile radio station and relay radio station;
   sending a first, second or third control message to the mobile radio station from the relay radio station; and
   returning an acknowledgement message to the relay radio station from the mobile radio station,
   wherein the first control message notifies the mobile radio station of the nature of the sleep/wake cycle of the relay radio station with regard to a downlink transmission direction from the point of view of the mobile radio station, wherein the second control message notifies the mobile radio station of the nature of the sleep/wake cycle of the relay radio station with regard to the uplink transmission direction from the point of view of the mobile radio station, wherein the third control message notifies the mobile radio station of the nature of the sleep/wake cycle of the relay radio station with regard to the transmission of synchronization information to the mobile radio station, and wherein the acknowledgement message notifies the relay radio station of receipt and acceptance of the sleep/wake cycle communicated in the first, second or third control message.

2. The method of claim 1, wherein the second control message is combined with the first control message and is sent in a joint control message.

3. The method of claim 1, wherein the acknowledgement for the first and second control messages is sent in a joint acknowledgement message.

4. The method of claim 1, further comprising the mobile radio station returning a negative acknowledgement message to the relay radio station notifying the relay radio station of the nonacceptance of the sleep/wake cycle communicated in the first, second or third control message.

5. The method of claim 4, wherein the negative acknowledgement message contains a counterproposal for arranging a modified sleep/wake cycle.

6. The method of claim 1, wherein the data are transmitted using the mobile radio communication system based on the LTE standard.

7. A relay radio station for use in a method for operating a mobile radio station, wherein communication between a base station and the mobile radio station is routed via the relay radio station, wherein the relay radio station has an energy saving mode and the method includes operating the mobile radio station in an energy saving mode in which the mobile radio station is intermittently put into a sleep state, operating the relay radio station in an energy saving mode in which the relay radio station is intermittently put into a sleep state, and synchronizing the sleep/wake states of mobile radio station and relay radio station, wherein the relay radio station has communication mechanisms that send a first, second or third control message to the mobile radio station before the energy saving mode is initiated, wherein the first control message notifies the mobile radio station of the nature of the sleep/wake cycle of the relay radio station during the energy saving mode with regard to the downlink transmission direction from the point of view of the mobile radio station, wherein the second control message notifies the mobile radio station of the nature of the sleep/wake cycle of the relay radio station during the energy saving mode with regard to the uplink transmission direction from the point of view of the mobile radio station, and wherein the third control message notifies the mobile radio station of the nature of the sleep/wake cycle of the relay radio station during the energy saving mode with regard to the transmission of synchronization information to the mobile radio station, and wherein the mobile radio station has communication mechanisms that send an acknowledgement message to the relay radio station in which receipt and acceptance of the sleep/wake cycle communicated in the first, second or third control message is acknowledged.

8. The relay radio station of claim 7, wherein the relay radio station is installed in a transportation vehicle.

9. A mobile radio station for use in a method for operating a mobile radio station in communication with a base station and the mobile radio station via a relay radio station, wherein the mobile radio station has an energy saving mode, wherein the method includes operating the mobile radio station in an energy saving mode in which the mobile radio station is intermittently put into a sleep state, operating the relay radio station in an energy saving mode in which the relay radio station is intermittently put into a sleep state, and synchronizing the sleep/wake states of mobile radio station and relay radio station, and wherein the mobile radio station has communication mechanisms that, after receipt of a first, second or third control message used by a relay radio station to notify the mobile radio station of the nature of the sleep/wake cycle of the relay radio station during the energy saving mode with regard to the downlink transmission direction, the uplink transmission direction from the point of view of the mobile radio station or with regard to the transmission of synchronization information, return an acknowledgement message to the relay radio station before the energy saving mode is initiated, in which receipt and acceptance of the sleep/wake cycle communicated in the first, second or third control message is acknowledged.

10. The mobile radio station of claim 9, wherein the communication mechanisms send the acknowledgement for the first and second control messages in a joint acknowledgement message.

11. The mobile radio station of claim 9, wherein the communication mechanisms return a negative acknowledgement message to the relay radio station, which negative acknowledgement message notifies the relay radio station of the nonacceptance of the sleep/wake cycle communicated in the first, second or third control message.

12. The mobile radio station of claim 11, wherein the communication mechanisms use the negative acknowledgement message to send a counterproposal for arranging a modified sleep/wake cycle to the relay radio station.

* * * * *